(12) United States Patent
Pennington et al.

(10) Patent No.: US 8,762,542 B2
(45) Date of Patent: Jun. 24, 2014

(54) PROTOCOL FOR SHARING INFORMATION IN A PEER TO PEER SERVICE

(75) Inventors: Havoc Pennington, Westford, MA (US); Donald Fischer, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 928 days.

(21) Appl. No.: 11/565,168

(22) Filed: Nov. 30, 2006

(65) Prior Publication Data

US 2008/0130522 A1 Jun. 5, 2008

(51) Int. Cl.
*G06F 15/16* (2006.01)
(52) U.S. Cl.
USPC .......................................... 709/227; 707/622
(58) Field of Classification Search
USPC ......... 709/201, 203–205, 217, 220–224, 230, 709/226–228, 237; 707/622
See application file for complete search history.

(56) References Cited

U.S. PATENT DOCUMENTS

| | | | | |
|---|---|---|---|---|
| 6,549,937 B1 * | 4/2003 | Auerbach et al. | | 709/206 |
| 6,839,769 B2 * | 1/2005 | Needham et al. | | 709/243 |
| 6,973,299 B2 * | 12/2005 | Apfel | | 455/412.2 |
| 7,068,789 B2 * | 6/2006 | Huitema et al. | | 380/277 |
| 7,234,117 B2 * | 6/2007 | Zaner et al. | | 715/758 |
| 7,340,500 B2 * | 3/2008 | Traversat et al. | | 709/201 |
| 7,343,418 B2 * | 3/2008 | Herley | | 709/229 |
| 7,451,186 B2 * | 11/2008 | Morinigo et al. | | 709/206 |
| 7,523,385 B2 * | 4/2009 | Nguyen et al. | | 715/200 |
| 7,526,459 B2 * | 4/2009 | Flinn et al. | | 706/12 |
| 7,782,866 B1 * | 8/2010 | Walsh et al. | | 370/395.31 |
| 7,836,183 B1 * | 11/2010 | Barnett et al. | | 709/226 |
| 7,930,347 B2 * | 4/2011 | Maxwell et al. | | 709/205 |
| 7,958,250 B2 * | 6/2011 | Sridhar et al. | | 709/230 |
| 8,280,913 B2 * | 10/2012 | Bergin | | 707/793 |
| 2002/0156893 A1 * | 10/2002 | Pouyoul et al. | | 709/225 |
| 2002/0165815 A1 * | 11/2002 | Vincent | | 705/37 |
| 2003/0101235 A1 * | 5/2003 | Zhang | | 709/218 |
| 2004/0041836 A1 * | 3/2004 | Zaner et al. | | 345/751 |
| 2005/0091202 A1 * | 4/2005 | Thomas | | 707/3 |
| 2005/0216550 A1 * | 9/2005 | Paseman et al. | | 709/202 |
| 2006/0048059 A1 * | 3/2006 | Etkin | | 715/745 |
| 2006/0117378 A1 * | 6/2006 | Tam et al. | | 726/3 |
| 2007/0168433 A1 * | 7/2007 | Morgan | | 709/206 |
| 2007/0211651 A1 * | 9/2007 | Ahmed et al. | | 370/256 |
| 2007/0214259 A1 * | 9/2007 | Ahmed et al. | | 709/224 |
| 2007/0239819 A1 * | 10/2007 | Woods et al. | | 709/201 |
| 2007/0275696 A1 * | 11/2007 | Cheng et al. | | 455/412.1 |
| 2008/0043634 A1 * | 2/2008 | Wang et al. | | 370/252 |
| 2008/0117861 A1 * | 5/2008 | Balandina et al. | | 370/328 |
| 2008/0184030 A1 * | 7/2008 | Kelly et al. | | 713/156 |
| 2008/0196087 A1 * | 8/2008 | Ranjit | | 726/5 |
| 2009/0262668 A1 * | 10/2009 | Hemar et al. | | 370/260 |

* cited by examiner

*Primary Examiner* — Saleh Najjar
*Assistant Examiner* — Eric W Shepperd
(74) *Attorney, Agent, or Firm* — Lowenstein Sandler LLP

(57) ABSTRACT

An embodiment relates generally to a method of providing peer-to-peer services. The method includes selecting a peer-to-peer service and determining multiple participants from a social network to form a set of known peers. The method also includes executing the peer-to-peer service from the set of known peers using a peer-to-peer overlay.

6 Claims, 3 Drawing Sheets

SYSTEM FOR INFORMATION SHARING

SECURE P2P MODULE

PROTOCOL FOR SHARING INFORMATION IN A PEER TO PEER SERVICE

FIELD

This invention relates generally to peer-to-peer services, more particularly, to methods, apparatus, and systems for peer-to-peer services with known peers.

DESCRIPTION OF THE RELATED ART

File transfers in a network computer system is a well-known concept For example, in the early days of the Internet, file transfers were accomplished by connecting to a destination computer and executing a file transfer command (e.g. FTP). This type of data transfer can be referred to as a client-server model.

The client-server model of data transfer has disadvantages and faults. For example, if one server or several servers store copies, i.e., mirrors, of a file(s), these server(s) can be rapidly overwhelmed in response to a spike of popularity of the file(s). Accordingly, the user experience in obtaining these file(s) may be less than satisfactory.

Peer-to-peer (P2P) systems offer advantages over the traditional client-server model. A P2P computer network is a network that relies primarily on the computing power and bandwidth of the participants in the network rather than concentrating it in a relatively low number of servers. P2P networks are typically used for connecting nodes via largely ad hoc connections. Such networks are useful for many purposes.

Although P2P networks can offer greater bandwidth and availability of files, there are still drawbacks and disadvantages. For example, since a selected file is distributed among the peers in a given P2P network, a file download may not ever be completed if the peer that has the missing segment does not participate in the P2P network or is not online at the same time as the user Moreover, a user may not be ensured that a segment may be infected with malicious software (malware such as spyware, viruses, etc.). Accordingly, there is need for a P2P network system that provides a measure of security as well as availability.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof However, one of ordinary skill in the art would readily recognize that the same principles are equally applicable to, and can be implemented in, all types of networked computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods, apparatus, and systems for providing peer-to-peer (P2P) services with known peers. More particularly, a secure P2P module may be configured to provide substantially the same services as current P2P networks. However, the secure P2P module retrieves data from known peers of the user. More particularly, the secure P2P module may provide the requested P2P service from a set of known peers that the user has predetermined. In some embodiments, the set of known peers may be derived from a social network that the user is a member of. Moreover, the secure P2P module may only allow known peers to access the computer of the user. In effect, the secure P2P module may function as a guardian allowing only approved peers to access data to and from the associated computing device of the user.

Figure 1:
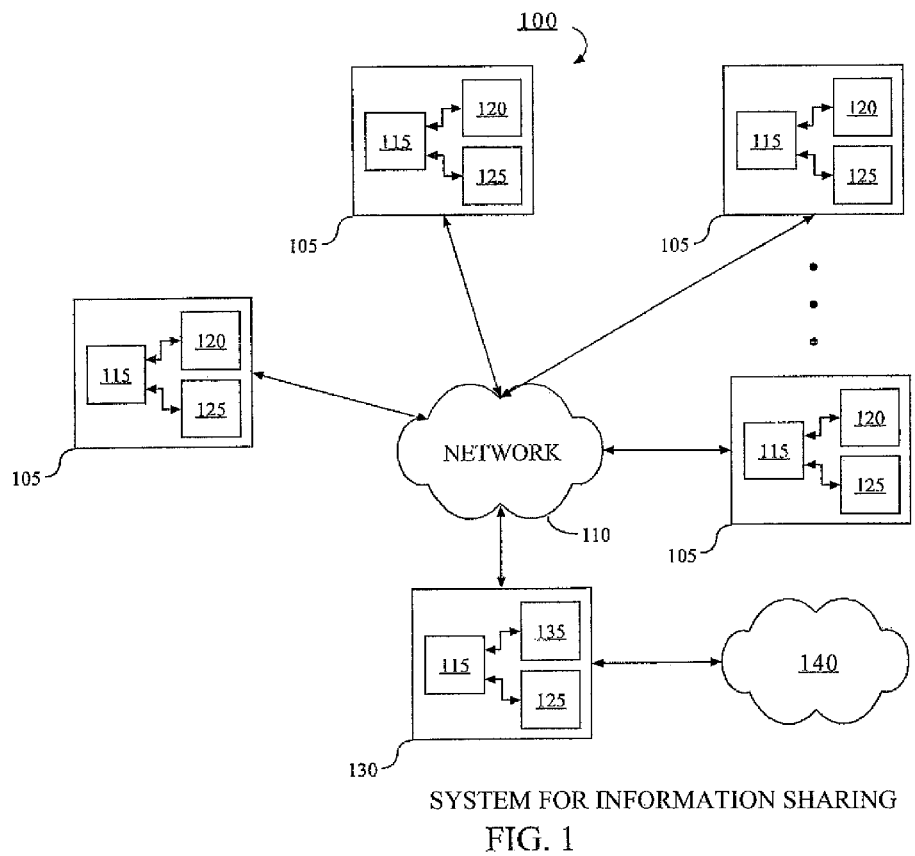
FIG. 1 illustrates an exemplary system in accordance with an embodiment.

FIG. 1 illustrates an exemplary system in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 may include a plurality of peers 105 coupled by network 110. The network 110 may be a local area network, a wide area network or a combination thereof. The local area network may be an Institute of Electrical and Electronics Engineers (IEEE 802.xx network, ad hoc network, or combinations thereof. The wide area network may be X.25, Asynchronous Transfer Mode (ATM), Synchronous Optical Network (SONET), Internet or combinations thereof.

The peers 105 may be a collection of computing platforms that may participate in a peer-to-peer (P2P) network. The peers 105 may be implemented with personal computers, workstations, thin clients, thick clients, or other similar computing devices. The peers 105 may use an operating system 115 such as LINUX®, WINDOWS®, MACINTOSH® or other available operating systems known to those skilled in the art. Each peer 105 may also execute a peer-to-peer overlay 120 on the operating system 115. The peer-to-peer overlay 120 may be configured to provide the P2P services for each respective peer. The peer-to-peer overlay 120 may implement P2P services such as Bit-Torrent, KaZaa, Napster, a content-addressable network (CAN), CHORD, or other similar P2P protocol. Of note, in addition to typical public torrents, the torrent used by embodiments of the present invention can be private or secure (e.g., personal video). The peers 105 may also execute a social network client 125. The social network client 125 provides the data necessary for a user to participate in a social network such as YOUTUBE.COM, MYSPACE.COM, or other similar social networks.

The system 100 also includes user platform 130, which is also coupled with the network 110. The user platform 130 may be selected from the peers 105 or be similar in operating characteristics with the peers 105. As such, the user platform 130 may include operating system 115 and social network client 125 as with the peers 105. The operating system 115 may be configured to provide a software framework to provide services, such as, instant messaging, downloading or playback of files. The operating system 115 may be implemented with known operating systems such as LINUX®, WINDOWS®, MACINTOSH® or other available operating systems known to those skilled in the art. The social network client 125 provides the data necessary for a user to participate in a social network such as YOUTUBE.COM, MYSPACE.COM, or other similar social networks. The user platform 130 may be implemented with personal computers, workstations, thin clients, thick clients, or other similar computing platform.

In some embodiments, the user platform 130, among other functionalities, may execute a secure peer-to-peer (P2P) module 135. The secure P2P module 135 may be configured to provide a user with the same P2P services as with the peer-to-peer overlay 120 that provide for conventional P2P networks (e.g., Bit-Torrent, KaZaa, CHORD, CAN and Freenet) but within a user-selected subset of the peers 105. More particularly, the user of the user platform 130 may participate in a social network 140. The social network 140 may include a subset of the peers 105. Accordingly, when the user invokes the secure P2P module 135, the secure P2P module 135 provides any requested P2P service from the subset of peers as defined by the participants in the social network 140. Alternatively, the secure P2P module 135 may provide a mechanism for a user to select a group of peers. For example the secure P2P module 135 may provide for a user interface that allows a user to select the members of the set of known peers.

Figure 2:
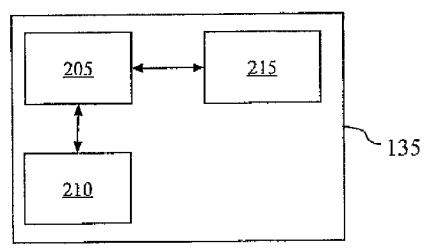
FIG. 2 illustrates an exemplary secure peer module in accordance with another embodiment.

FIG. 2 illustrates an exemplary secure P2P module 135 in accordance with another embodiment. It should be readily apparent to those of ordinary skill in the art that the secure P2P module 135 depicted in FIG. 2 represents a generalized schematic illustration and that other components may be added or existing components may be removed or modified. Moreover, the secure P2P module 135 may be implemented using software components, hardware components, or combinations thereof.

As shown in FIG. 2, the secure P2P module 135 may comprise a control module 205 coupled to a memory 210 and an interface 215. The control module 205 may be configured to provide an execution framework for the functionality of the secure P2P module 135 as described previously and in further detail below. The control module 205 may be implemented as an integrated circuit such as application specific integrated circuit, field programmable gate array or other similar programmable device, combination of circuits, microprocessor, or digital signal processor. Alternatively, the secure P2P module 135 may be implemented as software program, application, subroutine, and/or function call. In yet other embodiments, the secure P2P module 135 may be combination of hardware and software components as known to those skilled in the art.

The memory 210 may be configured to provide a storage function for the secure P2P module 135. The memory 210 may be used, among other uses, as storage for downloaded files or as a temporary buffer for files being used for P2P services. The memory 210 may also store a software application that provides the functionality of the secure P2P module 135. The memory 210 may be implemented using high speed memory such as dynamic random access memory or other similar technologies. In alternative embodiments, the memory 210 may be allocated in the main memory by the underlying operating system in response to the invocation of the secure P2P module 135.

The interface 215 may be configured to provide a communication port for the control module 205 to interact with the operating system as well as the peers 105. The interface 215 may be implemented as a standard interface such as peripheral control interface, Small Computer System Interface (SCSI), IEEE 1394 in hardware embodiments or a software port in software embodiments.

Accordingly, the control module 205 may be configured to receive a request for a P2P service. The control module 205 may retrieve a file which stores the information related to the participants of the social network of a user. The control module 205 may then start the P2P overlay service based on the peer information from the retrieved file. As noted previously, the P2P service can be a file playback or download or other P2P services. For example, a user may execute a file download (e.g., music, video, application program, etc.). The secure P2P module 135 begins the download of the file only from the peers associated the participants in the social network of the user.

Figure 3:
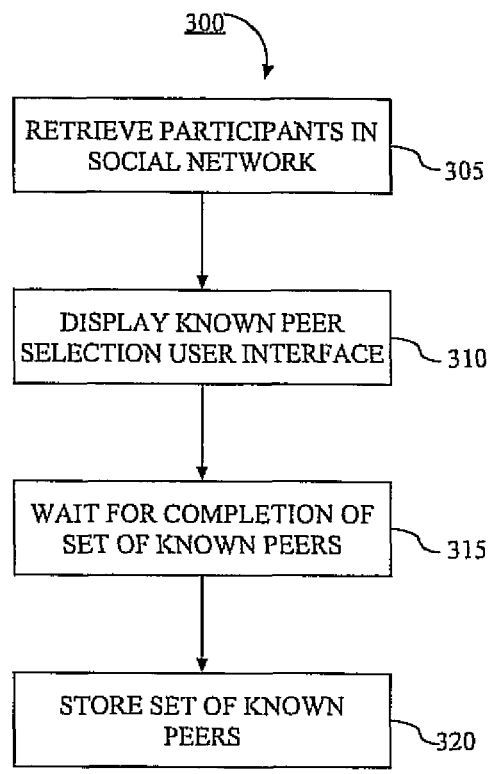
FIG. 3 illustrates an exemplary flow diagram implemented by the secure peer module in accordance with yet another embodiment.

FIG. 3 illustrates an exemplary flow diagram 300 implemented by the control module 205 of the secure P2P module 135 in accordance with yet another embodiment. It should be readily apparent to those of ordinary skill in the art that the flow diagram 300 depicted in FIG. 3 represents a generalized schematic illustration and that other steps may be added or existing steps may be removed or modified.

As shown in FIG. 3, in step 305, the control module 205 of the secure P2P module 135 may be configured to retrieve the list of participants in the user's social network such as MYSPACE.COM, CLASSMATES.COM and other similar websites, in step 305.

In step 310, the control module 205 may be configured to display the list of the participants for the user. For example, the control module 205 may display a dialog box requesting the user to select from the list of participants in the social network to form a set of known peers. The dialog box may include a button configured to include all the participants in the set of known peers. The dialog box may also include a selection mechanism to select participants in the set of known peers.

In step 315, the control module 205 may be configured to wait for a user to initiate the creation of the set of known peers. Continuing with the previous example, the dialog box may include another button that initiates the creation of the set of known peers after the user has completed the selection thereof.

In step 320, the control module 205 may be configured to create the list of known peers and store in the memory 210.

Figure 4:
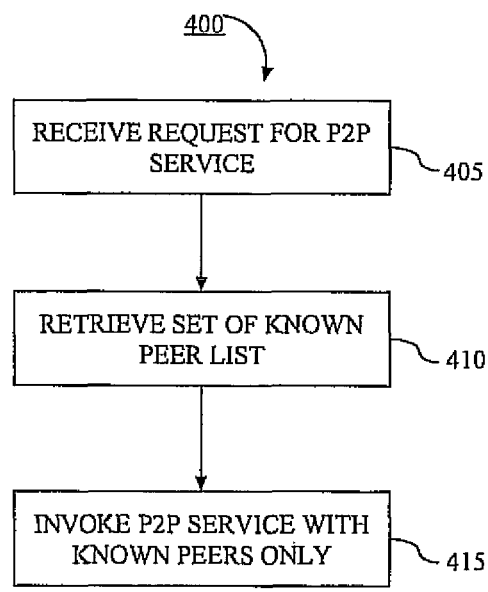
FIG. 4 illustrates another exemplary flow diagram implemented by the secure peer module in accordance with yet another embodiment.

FIG. 4 illustrates an exemplary flow diagram 400 implemented by the control module 205 of the secure P2P module 135 in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, in step 405, the control module 205 of the secure P2P module 135 may receive a request for a P2P service, e.g., playback and/or download of a file. The control module 205 may retrieve a file that contains a set of known peers from the memory 215, in step 410.

In step 415, the control module 205 may be configured to invoke the requested P2P service. More particularly, the control module 205 may initiate the requested P2P service with only the set of known peers to provide the requested P2P service.

Figure 5:
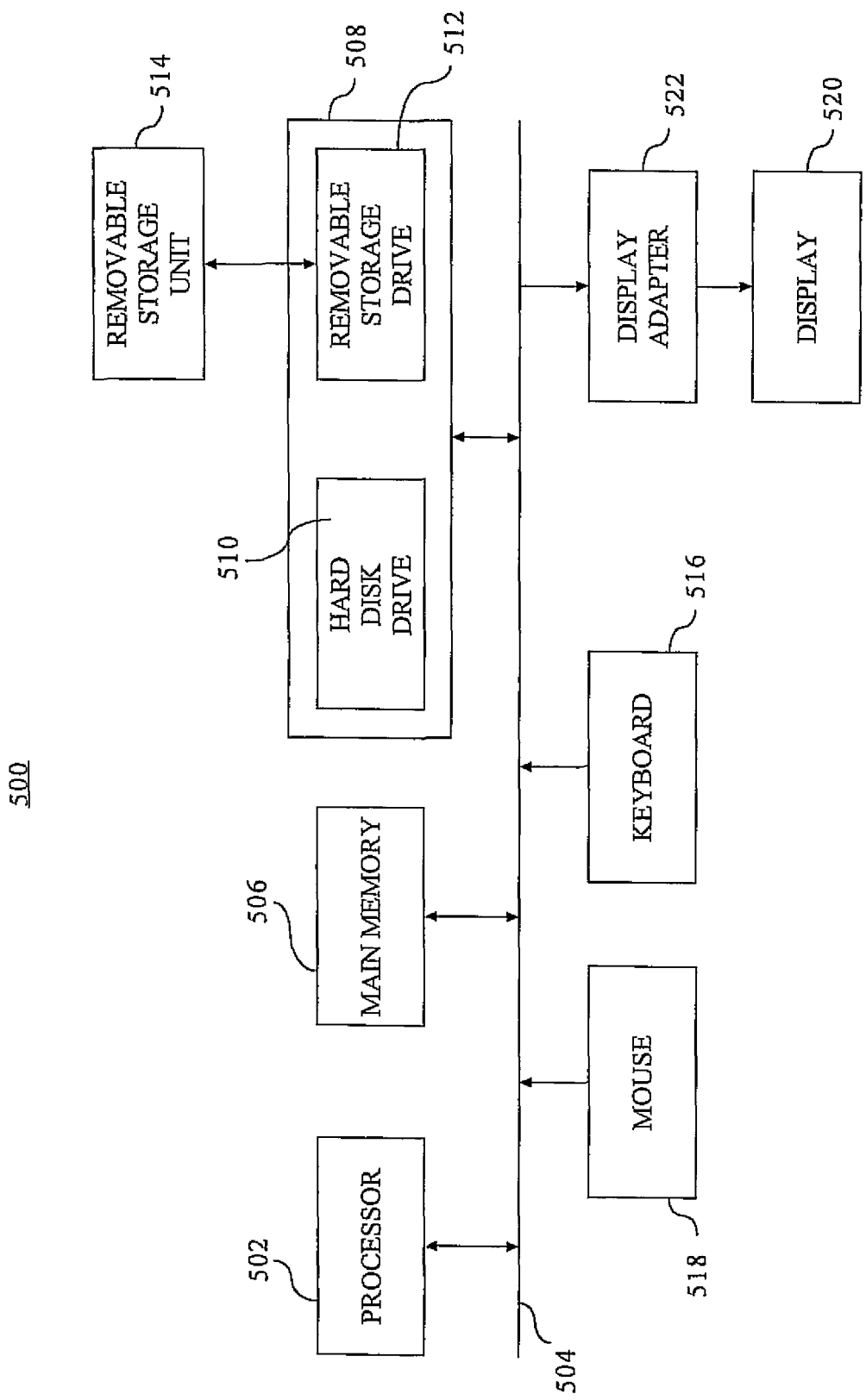
FIG. 5 illustrates an exemplary computing platform for executing the secure peer module in accordance with yet another embodiment.

FIG. 5 illustrates an exemplary block diagram of a computing platform 500 where an embodiment may be practiced. The functions of the operating system and secure P2P module may be implemented in program code and executed by the computing platform 500. The operating system and delay process may be implemented in computer languages such as PASCAL, C, C++, JAVA, etc.

As shown in FIG. 5, the computer system 500 includes one or more processors, such as processor 502 that provide an execution platform for embodiments of the operating system and secure P2P module. Commands and data from the processor 502 are communicated over a communication bus 504. The computer system 500 also includes a main memory 506, such as a Random Access Memory (RAM), where the operating system and secure P2P module may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the operating system and secure P2P module may be stored. The removable storage drive 512 reads from and/or writes to a removable storage unit 514 in a well-known manner. A user interfaces with the operating system and secure P2P module with a keyboard 516, a mouse 518, and a display 520. A display adapter 522 interfaces with the communication bus 504 and the display 520. The display adapter also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   receiving, by a processor of a first peer from a user, a selection of a peer-to-peer service maintaining a set of peers;
   retrieving, by the processor, in response to the selection of the peer-to-peer service, from a social network independent of the peer-to-peer service, a list of participants associated with the user on the social network;
   selecting, by the processor, without interaction by the user, a subset of known peers of the set of peers in view of the list of participants; and
   invoking, by the processor, without interaction by the user, the selected peer-to-peer service between the first peer and only the subset of known peers using a peer-to-peer overlay.

2. The method of claim 1, further comprising selecting the subset of known peers of the set of peers in response to the selection of the peer-to-peer service.

3. The method of claim 1, further comprising associating a respective computer of each participant of the participants as a peer computer in the peer-to-peer service.

4. A non-transitory computer-readable medium comprising instructions for causing a processor to perform operations comprising:
   receiving, by the processor from a user, a selection of a peer-to-peer service maintaining a set of peers;
   retrieving, by the processor, in response to the selection of the peer-to-peer service, a file storing a list of participants associated with the user from a social network independent of the peer-to-peer service;
   selecting, by the processor, without interaction by the user, a subset of known peers of the set of peers of the peer-to-peer service in view of the list of participants of the social network; and
   invoking, by the processor, without interaction by the user, the selected peer-to-peer service between the user and only the subset of known the set of peers using a peer-to-peer overlay.

5. A system comprising:
   a memory comprising instructions;
   a processor, coupled to the memory, the processor executing the instructions to cause the processor to:
      receive, from a user, a selection of a peer-to-peer service on a destination computing platform, the peer-to-peer service maintaining a set of peers,
      retrieve, in response to the selection of the peer-to-peer service, a file storing a list of participants associated with the user on a social network associated with the destination computing platform, the social network being independent of the peer-to-peer service,
      select, without interaction by the user, a subset of known peers of the set of peers in view of the list of participants, and
      execute the peer-to-peer service between the destination computing platform and the subset of known peers using a peer-to-peer overlay.

6. The system of claim 5, wherein the processor associates a respective computing platform of each participant of the participants as a peer computer in the peer-to-peer service.

* * * * *